(12) United States Patent
Komiyama et al.

(10) Patent No.: US 10,654,479 B2
(45) Date of Patent: May 19, 2020

(54) LANE DEVIATION PREVENTION CONTROL DEVICE FOR VEHICLE

(71) Applicant: SUBARU CORPORATION, Tokyo (JP)

(72) Inventors: Natsumi Komiyama, Tokyo (JP); Takeshi Tamaki, Tokyo (JP); Ryo Hajika, Tokyo (JP); Hiroyuki Negishi, Tokyo (JP); Masahito Takizawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 75 days.

(21) Appl. No.: 16/172,395

(22) Filed: Oct. 26, 2018

(65) Prior Publication Data

US 2019/0202454 A1 Jul. 4, 2019

(30) Foreign Application Priority Data

Dec. 28, 2017 (JP) ................................. 2017-253940

(51) Int. Cl.
*B62D 6/00* (2006.01)
*B60W 30/12* (2020.01)
(Continued)

(52) U.S. Cl.
CPC .......... *B60W 30/12* (2013.01); *B62D 15/025* (2013.01); *G08G 1/166* (2013.01); *G08G 1/167* (2013.01); *B60W 2510/202* (2013.01)

(58) Field of Classification Search
None
See application file for complete search history.

(56) References Cited

U.S. PATENT DOCUMENTS 2,877,967 A * 3/1959 Markusen ............ G05D 1/0202
244/185
4,031,527 A * 6/1977 Yanagishima ......... B60K 28/06
340/576

(Continued)

FOREIGN PATENT DOCUMENTS

JP 63168508 A * 7/1988
JP 11-180327 A 7/1999

(Continued)

OTHER PUBLICATIONS

Japanese Notice of Reasons for Refusal issued in corresponding Japanese Patent Application No. 2017-253940, dated Oct. 1, 2019, with English translation.

*Primary Examiner* — Shelley Chen
(74) *Attorney, Agent, or Firm* — McDermott Will & Emery LLP

(57) ABSTRACT

A lane deviation prevention control device for a vehicle includes a target steering torque calculator, a friction torque estimator, and a friction compensation rate variable controller. The target steering torque calculator calculates target steering torque to be applied to a steering system of an own vehicle in a lane deviation prevention control. The friction torque estimator estimates friction torque of the steering system. The friction compensation rate variable controller performs, on the basis of steering torque produced by a driver's steering operation and on the basis of a traveling state of the own vehicle, a variable control of an addition rate at which the friction torque is added to the target steering torque to compensate friction of the steering system.

9 Claims, 9 Drawing Sheets

(51) Int. Cl.
  *G08G 1/16* (2006.01)
  *B62D 15/02* (2006.01)

(56) References Cited

U.S. PATENT DOCUMENTS

| | | | | |
|---|---|---|---|---|
| 6,496,759 B1* | 12/2002 | Mattes | ............... | B60R 21/013 |
| | | | | 180/282 |
| 6,577,948 B1* | 6/2003 | Skellenger | ........... | G01C 21/26 |
| | | | | 303/140 |
| 7,996,131 B2* | 8/2011 | Yamashita | ............. | G01B 21/22 |
| | | | | 280/735 |
| 2002/0042671 A1* | 4/2002 | Chen | .................. | B60K 28/16 |
| | | | | 701/41 |
| 2003/0023359 A1* | 1/2003 | Kueblbeck | ............ | B60R 21/013 |
| | | | | 701/45 |
| 2004/0183663 A1* | 9/2004 | Shimakage | ........ | G06K 9/00798 |
| | | | | 340/436 |
| 2005/0096828 A1* | 5/2005 | Uemura | ............ | B60T 8/17557 |
| | | | | 701/70 |
| 2009/0088926 A1* | 4/2009 | Yamashita | ............ | G01B 21/22 |
| | | | | 701/41 |
| 2011/0238252 A1* | 9/2011 | Takeda | ............... | B60W 40/072 |
| | | | | 701/31.4 |
| 2012/0109460 A1* | 5/2012 | Tokimasa | ........... | B60W 50/045 |
| | | | | 701/41 |
| 2013/0063595 A1* | 3/2013 | Niem | .................. | B62D 15/025 |
| | | | | 348/148 |
| 2014/0277945 A1 | 9/2014 | Chandy | | |
| 2015/0246687 A1* | 9/2015 | Takeda | .................. | B62D 6/002 |
| | | | | 701/41 |
| 2015/0251656 A1* | 9/2015 | Yester | .................. | B60W 30/09 |
| | | | | 701/41 |
| 2015/0274206 A1* | 10/2015 | Takeda | .................. | B62D 6/008 |
| | | | | 701/41 |
| 2016/0001810 A1* | 1/2016 | Tsubaki | ................ | B62D 6/002 |
| | | | | 701/42 |
| 2016/0114832 A1* | 4/2016 | Taniguchi | ........... | B62D 15/025 |
| | | | | 701/41 |
| 2016/0280262 A1* | 9/2016 | Oyama | ................ | B62D 15/025 |
| 2017/0113546 A1* | 4/2017 | Maeda | .................. | B60K 23/04 |
| 2018/0057054 A1* | 3/2018 | Tokoro | ................ | G08G 1/167 |
| 2018/0202804 A1* | 7/2018 | Dumble | ............... | G01B 21/24 |

FOREIGN PATENT DOCUMENTS

| | | | |
|---|---|---|---|
| JP | 2005096710 A | * | 4/2005 |
| JP | 2008-308091 A | | 12/2008 |
| JP | 2011-230666 A | | 11/2011 |
| JP | 2015-189410 A | | 11/2015 |
| JP | 2016-064799 A | | 4/2016 |
| JP | 2016-175446 A | | 10/2016 |
| JP | 2017-171224 A | | 9/2017 |
| JP | 2017189989 A | * | 10/2017 |

* cited by examiner

LANE DEVIATION PREVENTION CONTROL DEVICE FOR VEHICLE

CROSS-REFERENCE TO RELATED APPLICATIONS

The present application claims priority from Japanese Patent Application No. 2017-253940 filed on Dec. 28, 2017, the entire contents of which are hereby incorporated by reference.

BACKGROUND

The technology relates to a lane deviation prevention control device for a vehicle that executes a lane deviation prevention control including preventing the vehicle from deviating from its traveling lane.

Regarding vehicles, e.g., automobiles, there has been known a technique of providing a vehicle with a steering device such as an electronic power steering (EPS) device, and performing a steering assistance control such as a lane keeping control and a lane deviation prevention control, on the basis of exterior environment around the vehicle. The EPS device is able to control a steering angle through an electronic motor, independently of a driver's steering operation. The lane keeping control includes keeping a traveling position of an own vehicle inside a lane. The lane deviation prevention control includes preventing the own vehicle from deviating from its traveling lane. The exterior environment may be recognized by, for example, a camera or radar equipment. For example, reference can be made to Japanese Unexamined Patent Application Publication (JP-A) No. 2016-64799.

SUMMARY

An aspect of the technology provides a lane deviation prevention control device for a vehicle. The lane deviation prevention control device includes a target steering torque calculator, a friction torque estimator, and a friction compensation rate variable controller. The target steering torque calculator is configured to calculate target steering torque to be applied to a steering system of an own vehicle in a lane deviation prevention control. The lane deviation prevention control includes preventing the own vehicle from deviating from a lane on which the own vehicle is traveling. The friction torque estimator is configured to estimate friction torque of the steering system. The friction compensation rate variable controller is configured to perform, on the basis of steering torque produced by a driver's steering operation and on the basis of a traveling state of the own vehicle, a variable control of an addition rate at which the friction torque is added to the target steering torque to compensate friction in the steering system.

An aspect of the technology provides a lane deviation prevention control device for a vehicle. The lane deviation prevention control device includes circuitry. The circuitry is configured to calculate target steering torque to be applied to a steering system of an own vehicle in a lane deviation prevention control. The lane deviation prevention control includes preventing the own vehicle from deviating from a lane on which the own vehicle is traveling. The circuitry is configured to estimate friction torque of the steering system. The circuitry is configured to perform, on the basis of steering torque produced by a driver's steering operation and on the basis of a traveling state of the own vehicle, a variable control of an addition rate at which the friction torque is added to the target steering torque to compensate friction in the steering system.

DETAILED DESCRIPTION

In the following, some implementations of the technology are described with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example implementations which are not recited in a most-generic independent claim of the disclosure are optional and may be provided on an as-needed basis. The drawings are schematic and are not intended to be drawn to scale. Throughout the specification and the drawings, elements having substantially the same function and configuration are denoted with the same numerals to avoid redundant description.

In general, in a steering control through an electric motor such as an EPS device, friction compensation torque is added to target steering toque. The friction compensation torque compensates friction in a steering system. The target steering torque controls a posture of a vehicle at a target yaw angle. The addition of the friction compensation torque alleviates influences of, for example, variations because of individual differences and secular changes of the steering system, leading to a more precise control.

In contrast, in a driver assistance control that assumes a driver who is grasping a steering wheel, there are cases where a system determines possibility of lane deviation and starts a lane deviation prevention control, and at the same time, the driver turns the steering wheel in a direction in which the lane deviation is prevented.

In such cases, steering torque produced by the driver's steering operation compensates a portion or all of the friction in the steering system. Thus, univocally adding the friction compensation torque to the target steering torque causes excess or deficiency in final instruction torque. This generates unsmooth torque variations and changes in a steering angle, which may possibly give the sense of incongruity to the driver.

It is desirable to provide a lane deviation prevention control device for a vehicle that makes it possible to appropriately compensate friction in a steering system at a start of a lane deviation prevention control, leading to prevention of lane deviation without giving the sense of incongruity to a driver.

Figure 1:
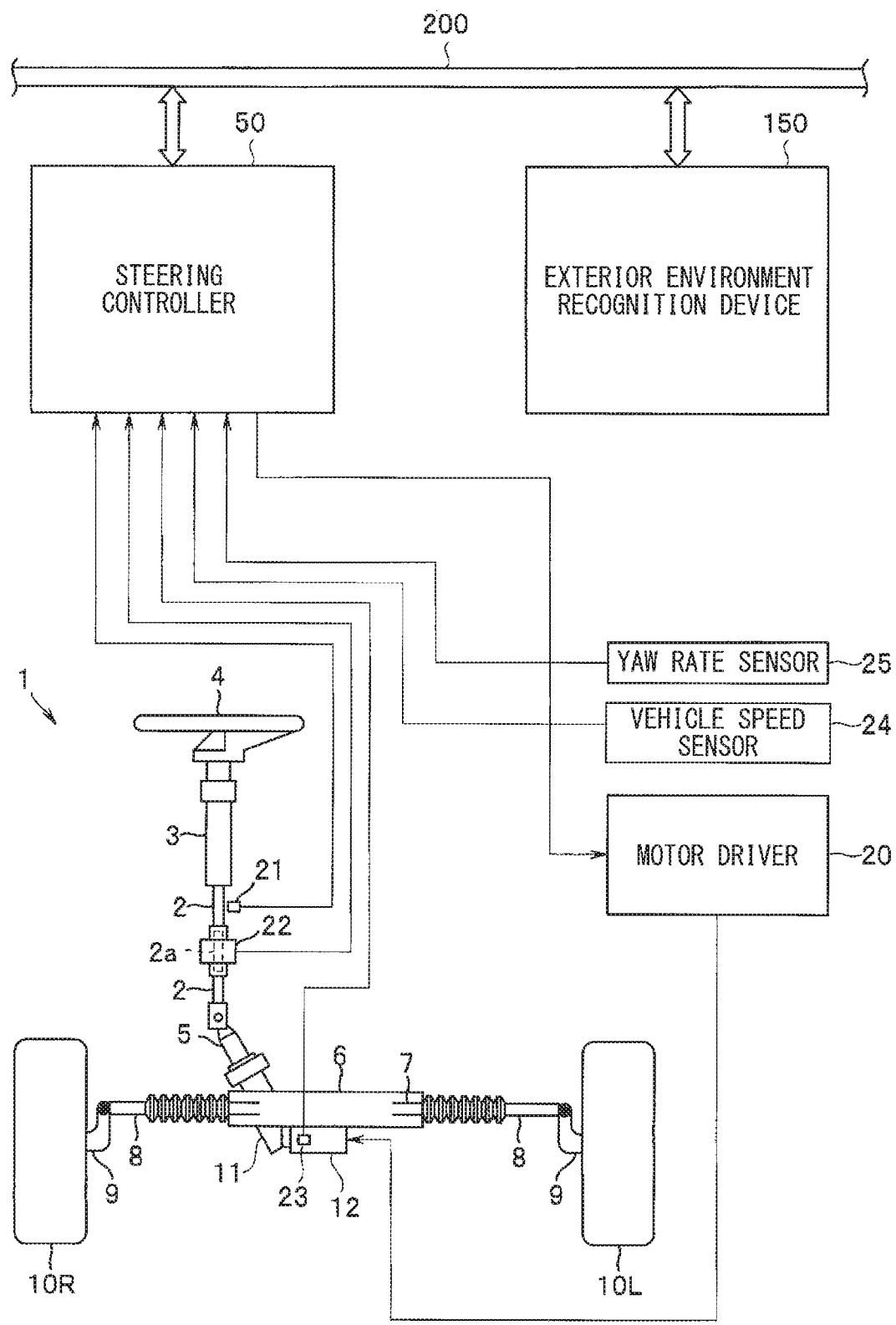
FIG. 1 is a diagram illustrating an example of a configuration of a vehicle steering system.

FIG. 1 illustrates an electronic power steering (EPS) device 1. The EPS device 1 may serve as a steering device that is able to control a steering angle through an actuator, independently of a driver's steering operation. In the EPS device 1, a steering shaft 2 may be rotatably supported, through a steering column 3, by an undepicted chassis of a vehicle, e.g., an automobile.

One end of the steering shaft 2 may be extended toward a driver's seat, while another end of the steering shaft 2 may be extended toward an engine room. A steering wheel 4 may be fixed to the end of the steering shaft 2 on side on which the driver's seat is disposed. A steering angle sensor 21 may be disposed on outer circumferential side of the steering shaft 2 to which the steering wheel 4 is coupled.

The steering angle sensor 21 may include, for example, two pairs of magnetoresistive elements, in its inside. The magnetoresistive elements may detect rotation of a magnet incorporated in a sensing gear. The steering angle sensor 21 may set in advance a reference rotation position of the steering wheel 4. The reference rotation position may be, for example, a rotation position of an upper part of the steering wheel 4 in a straight traveling state of the vehicle. Thus, the steering angle sensor 21 may be able to detect, on the basis of a variation in magnetism caused by rotation of the sensing gear, a rotation angle, i.e., a steering angle, and a rotation direction, i.e., a steering direction, from the fixed reference position set in advance.

A torsion bar 2a may be disposed in the middle of the steering shaft 2. A pinion shaft 5 may be coupled to the end of the steering shaft 2 extended toward the engine room. A torque sensor 22 may be disposed on outer circumferential side of the torsion bar 2a. The torque sensor 22 may detect dislocation caused by torsion of the torsion bar 2a. The dislocation is generated circumferentially around the steering shaft 2, between side on which the steering wheel 4 is disposed and side on which the pinion shaft 5 is disposed. Thus, the torque sensor 22 may be able to detect steering torque produced by the driver's steering operation. The steering torque produced by the driver's steering operation is hereinafter also referred to as "driver's steering torque".

A steering gear box 6 may be disposed inside the engine room. The steering gear box 6 may extend in a vehicle widthwise direction. A rack shaft 7 may be reciprocatably inserted in and supported by the steering gear box 6. The rack shaft 7 may include undepicted racks. The racks may be engaged with pinions formed on the pinion shaft 5, to form a rack-and-pinion steering mechanism.

Right and left ends of the rack shaft 7 may be protruded from respective ends of the steering gear box 6. To the protruded ends of the rack shaft 7, coupled may be front knuckles 9, through tie rods 8. The front knuckles 9 may rotatably support right and left wheels 10R and 10L as steering wheels. The front knuckles 9 may be steerably supported by the chassis. Operating the steering wheel 4 causes rotation of the steering shaft 2 and the pinion shaft 5. The rotation of the pinion shaft 5 causes rightward or leftward movement of the rack shaft 7. The movement causes the front knuckles 9 to rotate around an undepicted king pin shaft as a center, causing the right and left wheels 10R and 10L to be steered rightward or leftward.

An electric power steering (EPS) motor 12 may be coupled to the pinion shaft 5 through an assistant transmission mechanism 11. The EPS motor 12 may serve as an actuator that allows for assistance with the driver's steering operation and automatic steering. The assistant transmission mechanism 11 may include a reduction gear mechanism such as worm gears. The EPS motor 12 may be, for example, an electric motor constituted by a direct current (DC) brushless motor including a stator and a rotor. The stator may be fixed to a case. The rotor may rotate inside the stator. The rotation of the rotor of the electric motor is converted, through the assistant transmission mechanism 11, into axial movement of the rack shaft 7.

A rotation angle sensor 23 may be incorporated in the EPS motor 12. The rotation angle sensor 23 may detect a rotation angle of the rotor. The rotation angle sensor 23 may be, for example, a sensor that detects a relative rotation angle of the rotor to a predetermined zero point position by, for example, a rotary encoder. A signal from the rotation angle sensor 23 may be supplied to the steering controller 50.

It is to be noted that in the rotation angle sensor 23, initial setting of the zero point position may be provided, for example, when an ignition switch is turned to an 'ON' position. The initial setting may be based on the steering angle detected by the steering angle sensor 21 and based on a reduction ratio of the assistant transmission mechanism 11. Normally, the rotation angle detected by the rotation angle sensor 23 and the rotation angle of the steering wheel 4, i.e., a steering wheel angle, detected by the steering angle sensor 21 may be dealt as the same steering angle.

The steering controller 50 may be a control unit that includes a microcomputer as its main component. The microcomputer may include, for example, a central processing unit (CPU), a read only memory (ROM) that stores, for example, programs, and a random access memory (RAM) that serves as a work area. The steering controller 50 may perform a drive control of the EPS motor 12 through the motor driver 20. The steering controller 50 may be supplied with signals from sensors and undepicted switches. Non-limiting examples of the sensors may include the steering angle sensor 21, the torque sensor 22, the rotation angle sensor 23, and other sensors including a vehicle speed sensor 24 and a yaw rate sensor 25. The vehicle speed sensor 24 may detect a vehicle speed. The yaw rate sensor 25 may detect a yaw rate, i.e., a rotation speed of the vehicle around a vertical axis.

The steering controller 50 may be coupled to a communication bus 200 that forms an in-vehicle network. To the communication bus 200, coupled may be an exterior environment recognition device 150 that recognizes exterior environment of the vehicle, to acquire travel environment information. Other undepicted controllers may be also coupled to the communication bus 200. Non-limiting examples may include an engine controller, a transmission controller, and a brake controller. The controllers are able to transmit and receive control information to and from one another through the communication bus 200.

The exterior environment recognition device 150 may recognize the exterior environment around the own vehicle on the basis of, for example, detection information of objects around the own vehicle, traffic information, positioning information of a position of the own vehicle, and high definition map information. The detection information may be acquired by various devices such as a camera and millimeter wave radar for forward recognition, and a side camera and sideward radar for sideward recognition. The traffic information may be acquired by infrastructure communication such as road-vehicle communication and inter-vehicle communication. The positioning information may be based on signals from, for example, global positioning satellites (GPS). The high definition map information may include road shape data and data for a travel control. Non-limiting examples of the road shape data may include a curvature, a lane width, and a road shoulder width of a road. Non-limiting examples of the data for the travel control may include a road azimuth angle, categories of lane lines, and the number of lanes.

In this implementation, the exterior environment recognition device 150 may mainly perform recognition of forward environment of the own vehicle. The recognition of the forward environment may be made by an on-vehicle camera and an image recognition unit. As the camera for the forward recognition, used may be a stereo camera including two cameras that capture images of an identical object from different points of view. The two cameras that constitute the stereo camera may be a shutter synchronous camera including imaging elements such as charge coupled device (CCD) and complementary metal oxide semiconductor (CMOS). The two cameras may be disposed, for example, in the vicinity of a rearview mirror inside a front windshield in an upper part of a vehicle cabin, with a predetermined baseline length.

Processing on image data from the stereo camera may be carried out, for example, as follows. First, a distance image may be generated, on the basis of an amount of dislocation between corresponding positions, in a pair of stereo images in a traveling direction of the own vehicle captured by the stereo camera. The distance image may have distance information. With the use of the distance information of the distance image, recognition of lane lines and recognition processing of three-dimensional objects may be carried out. Non-limiting examples of the lane lines may include white lane lines and other kinds of lane lines. Non-limiting examples of the three-dimensional objects may include preceding vehicles and oncoming vehicles.

In the recognition of the lane lines such as the white lane lines, changes in luminance of a road in a widthwise direction may be evaluated on the basis of knowledge that the lane lines are higher in luminance than a road surface. Thus, positions of right and left lane lines on an image plane may be identified on the image plane. A position (x, y, z) of the lane line in actual space may be calculated by a known coordinate conversion expression, on the basis of the distance information, i.e., on the basis of a position (i, j) on the image plane and parallax calculated regarding the relevant position (i, j).

A coordinate system in the actual space may be set, with reference to the position of the own vehicle. In this implementation, as illustrated in, for example, FIG. 3, the coordinate system in the actual space may have the road surface directly below the camera as an origin, the vehicle widthwise direction as an x axis, a vehicle heightwise direction as a y axis, and a vehicle lengthwise direction, i.e., a direction of distance, as a z axis. At this occasion, an x-z plane (y=0) may coincide with the road surface, in a case where the road is flat. A road model may be represented, by dividing the traveling lane of the own vehicle on the road into a plurality of sections, approximating right and left lane lines in each section as predetermined, and coupling the approximated right and left lane lines to one another.

For the approximation processing of the right and left lane lines, adopted may be, for example, approximation processing of the lane lines by a least square method. In one specific but non-limiting example, the lane line on left side of the own vehicle may be approximated by the least square method, as given by the following expression (1). The lane line on right side of the own vehicle may be approximated by the least square method, as given by the following expression (2).

$$x = AL \cdot z^2 + BL \cdot z + CL \quad (1)$$

$$x = AR \cdot z^2 + BR \cdot z + CR \quad (2)$$

In the expressions (1) and (2) given above, "AL" and "AR" denote curvatures of respective curves. A curvature κL of the lane line on the left side may be 2·AL. A curvature κR of the lane line on the right side may be 2·AR. Thus, a lane curvature κ may be represented by the following expression (3).

$$\kappa = (2 \cdot AL + 2 \cdot AR)/2 = AL + AR \quad (3)$$

Figure 3:
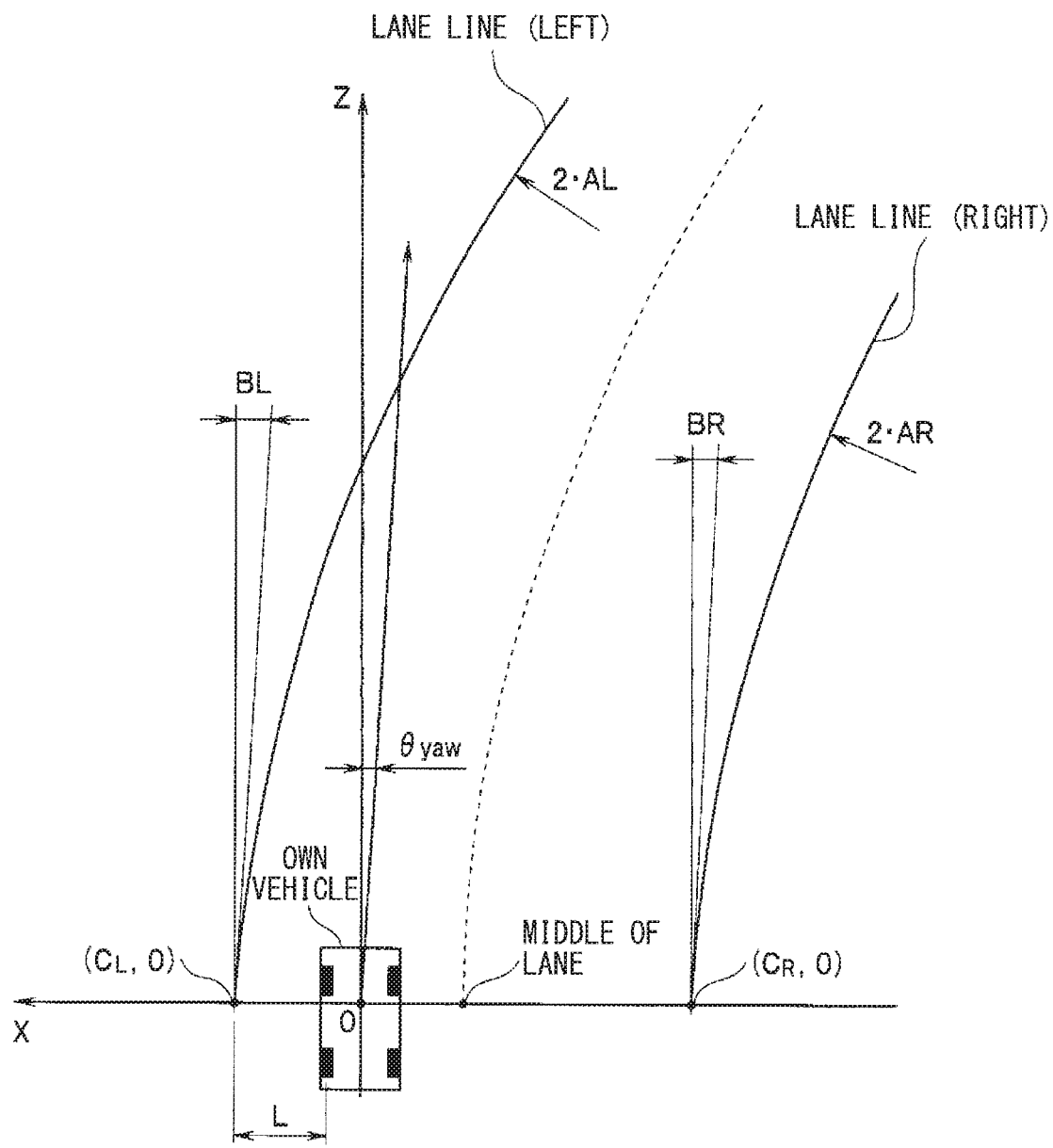
FIG. 3 is a diagram describing an own vehicle and a lane, together with various parameters.

In the expressions (1) and (2), "BL" and "BR" denote inclinations of the respective curves in the widthwise direction of the own vehicle. "CL" and "CR" denote positions of the respective curves in the widthwise direction of the own vehicle. Refer to FIG. 3.

The exterior environment recognition device 150 may further calculate a relative-to-lane yaw angle θyaw of the own vehicle, by the following expression (4).

$$\theta yaw = \tan^{-1}((BL+BR)/2) \quad (4)$$

A recognition result of the exterior environment by the exterior environment recognition device 150 may be transmitted to the steering controller 50 and other controllers. The steering controller 50 may perform a driver assistance control that includes automatic driving of the own vehicle and assisting the driver with driving. In the driver assistance control, the steering controller 50 may set a target course to be traveled by the own vehicle, from the recognition result of the exterior environment. The steering controller 50 may execute a steering assistance control, through the motor driver 20 that drives the EPS motor 12, to allow the own vehicle to travel to follow the target course. In a case with detection of steering interference by the driver's steering operation, the steering controller 50 may allow the EPS motor 12 to output assistive torque that assists the driver with the steering operation.

The target course in a steering control by the steering controller 50 may be set on the basis of the recognition result of the exterior environment by the exterior environment recognition device 150. For example, in a lane keeping control that includes allowing the own vehicle to follow a lane and keeping the own vehicle in the middle of the lane, the middle position between the right and left lane lines in a road widthwise direction may be set as the target course. The steering controller 50 may set a target steering angle that allows a middle position of the own vehicle in the vehicle widthwise direction to coincide with the target course. The steering controller 50 may control a drive current of the EPS motor 12, to allow the steering angle of the steering control to coincide with the target steering angle. It is to be noted that the target course may be set by other controllers than the steering controller 50, e.g., the exterior environment recognition device 150.

The steering controller 50 may execute not only the lane keeping control but also a lane deviation prevention control. The lane keeping control may include keeping the own vehicle in the middle of the lane. The lane deviation prevention control may include preventing the own vehicle from deviating from the lane. In one specific but non-limiting example, the steering controller 50 may calculate lane deviation estimated time Ttlc, in a case where the relative-to-lane yaw angle of the own vehicle is directed toward a direction of deviation, on the basis of information from the exterior environment recognition device 150 and on the basis of driving states of the own vehicle. The lane deviation estimated time Ttlc refers to time it takes for the own vehicle to stride over the lane line on the deviation side on which deviation is to be expected. In a case where the lane deviation estimated time Ttlc is equal to or smaller than a threshold Tth, the steering controller 50 may start the lane deviation prevention control. The threshold Tth may be decided by the vehicle speed V of the own vehicle and the lane curvature κ.

The lane deviation estimated time Ttlc may be obtained by dividing a distance L from the own vehicle to the lane line on the deviation side by a speed component of the vehicle speed V of the own vehicle corresponding to the relative-to-lane yaw angle θyaw, as represented by the following expression (5).

$$Ttlc = L/(V \cdot \sin \theta yaw) \quad (5)$$

In the lane deviation prevention control, instruction torque for the EPS motor 12 includes friction compensation torque that compensates friction in a steering system. When the driver makes any steering operation to avoid deviation, while the EPS motor 12 is driven by the lane deviation prevention control, a portion or all of the friction compensation torque is compensated by the driver's steering torque, i.e., the steering torque produced by the driver's steering operation. This may possibly cause excess in the instruction torque for the EPS motor 12. Accordingly, the steering controller 50 makes a variable control of the friction compensation torque in accordance with the driver's steering torque. Hence, it is possible to appropriately compensate friction, in a case with the driver's steering operation to avoid deviation at the start of the lane deviation prevention control.

Figure 2:
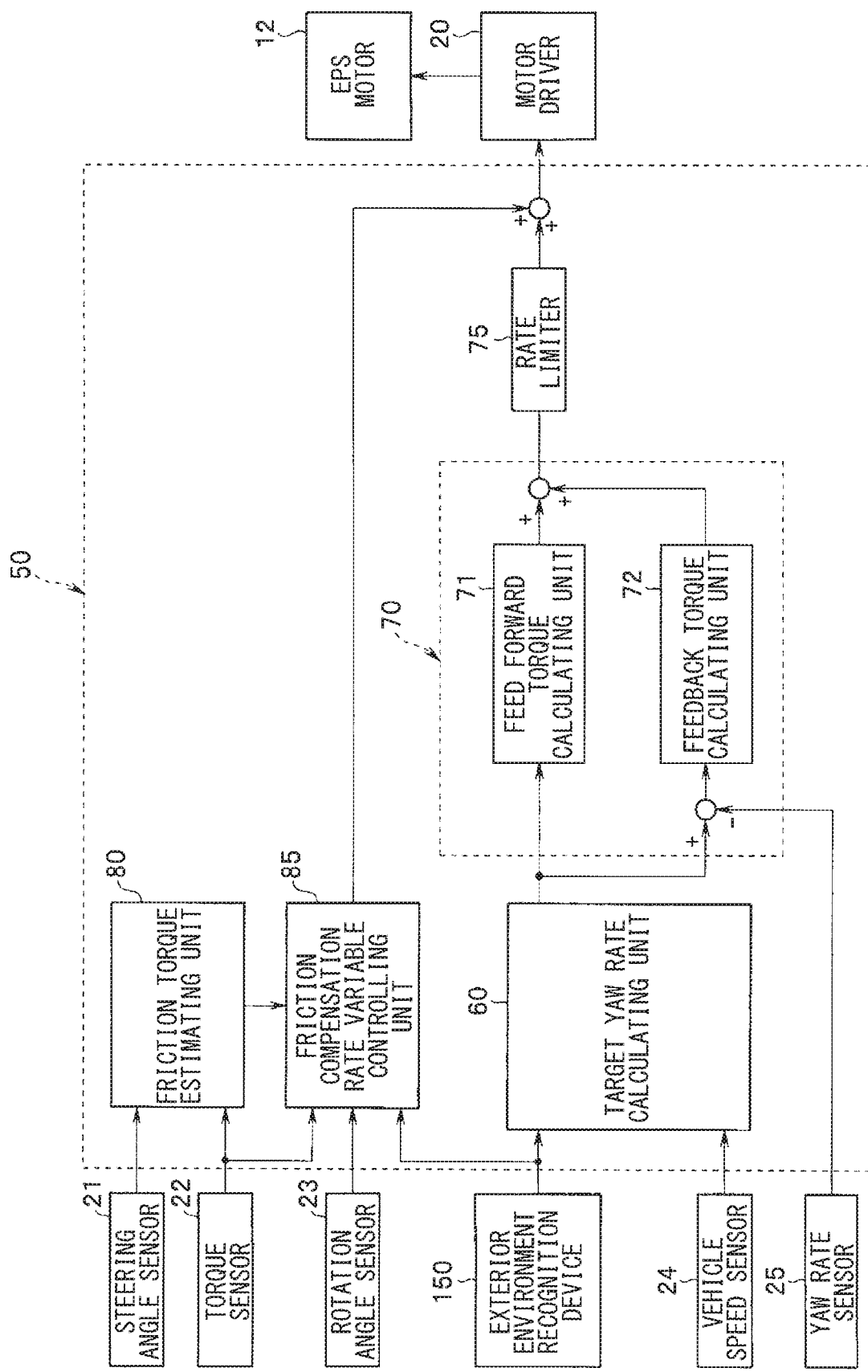
FIG. 2 is a block diagram illustrating an example of functions of a steering control system.

Thus, as illustrated in FIG. 2, the steering controller 50 may include, as its main configuration, a target yaw rate calculating unit 60, a target steering torque calculating unit 70, a rate limiter 75, a friction torque estimating unit 80, and a friction compensation rate variable controlling unit 85. The target yaw rate calculating unit 60 may calculate a target yaw rate. The target yaw rate may allow the own vehicle to travel along the target course. The target steering torque calculating unit 70 may calculate the target steering torque. The target steering torque is to be applied to the steering system of the own vehicle, to attain the target yaw rate. The rate limiter 75 may reduce a speed of change in the target steering torque to an extent that the speed does not give the sense of incongruity to, mainly, the driver. In one implementation, the rate limiter 75 may serve as a "limit processor". The friction torque estimating unit 80 may estimate the friction torque of the steering system. The friction compensation rate variable controlling unit 85 may perform a variable control of an addition rate, i.e., a compensation rate, at which the friction torque is added to the target steering torque subjected to the rate limit processing in the rate limiter 75, to compensate the friction in the steering system. The target yaw rate calculating unit 60, the target steering torque calculating unit 70, the rate limiter 75, the friction torque estimating unit 80, and the friction compensation rate variable controlling unit 85 may serve as functional units of the lane deviation prevention control related to the compensation of the friction.

It is to be noted that in this implementation, description is given of an example with the variable control of the addition rate, i.e., the compensation rate, at which the friction torque is added to the target steering torque after the rate limit processing. However, in one alternative, a variable control may be made on an addition rate, i.e., a compensation rate, at which the friction torque is added to the target steering torque before the rate limit processing.

In one specific but non-limiting example, the target yaw rate calculating unit 60 may calculate a lane curvature turn target yaw rate γtgt_lane and a deviation prevention behavior generation target yaw rate γtgt_turn. The lane curvature turn target yaw rate γtgt_lane may serve as a target amount of turn in accordance with the lane curvature. The deviation prevention behavior generation target yaw rate γtgt_turn may serve as a target amount of turn that prevents lane deviation. The deviation prevention behavior generation target yaw rate γtgt_turn and the lane curvature turn target yaw rate γtgt_lane may be added together to calculate a final target yaw rate γtgt, as represented by the following expression (6).

$$\gamma tgt = \gamma tgt\_lane + \gamma tgt\_turn \quad (6)$$

It is to be noted that as to the yaw rate and the curvature, a positive sign is assumed to represent a left turn. As to the relative-to-lane yaw angle, a positive sign is assumed to represent the direction of deviation from the lane line on the left side. As to a lateral position, a positive sign is assumed to represent inside the lane.

In one specific but non-limiting example, the lane curvature turn target yaw rate γtgt_lane may be calculated, with the vehicle speed V of the own vehicle and the lane curvature κ, as represented by the following expression (7).

$$\gamma tgt\_lane = \kappa \cdot V \quad (7)$$

In one specific but non-limiting example, the deviation prevention behavior generation target yaw rate γtgt_turn may be calculated separately as a target yaw rate γtgt_turn_1 in a deviation suppression control (relative-to-lane yaw angle θyaw≥0) and a target yaw rate γtgt_turn_2 in a posture decision control (relative-to-lane yaw angle θyaw<0). The deviation suppression control may include generating, in the own vehicle, behavior that prevents deviation, at and after the start of the lane deviation prevention control. The posture decision control may include controlling a posture of the own vehicle after the deviation suppression control until an arrival at a location of an end of the control. The target yaw rates γtgt_turn_1 and γtgt_turn_2 may be switched in accordance with the relative-to-lane yaw angle and the lateral position of the own vehicle. Thus, either one of them may be outputted as the deviation prevention behavior generation target yaw rate γtgt_turn.

The target yaw rate γtgt_turn_1 during the deviation suppression control may be calculated on the basis of the relative-to-lane yaw angle θyaw and the lane deviation estimated time Ttlc, as represented by the following expression (8).

$$\gamma tgt\_turn\_1 = \theta yaw / Ttlc \quad (8)$$

The target yaw rate γtgt_turn_2 during the posture decision control may be calculated by dividing, by target time Ttgt, a value obtained by multiplying, by a predetermined feedback gain Kyawfb, a deviation between a target relative-to-lane yaw angle θtgt_yaw at the end of the control and the relative-to-lane yaw angle θyaw during the posture decision control, as represented by the following expression (9). The target time Ttgt is time it takes to reach the target relative-to-lane yaw angle θtgt_yaw.

$$\gamma tgt\_turn\_2 = \cdot Kyawfb \cdot (\theta tgt\_yaw - \theta yaw)/Ttgt \quad (9)$$

The target steering torque calculating unit 70 may include a feedforward torque calculating unit 71 and a feedback torque calculating unit 72. The feedforward torque calculating unit 71 may calculate feedforward torque by a feedforward control. The feedback torque calculating unit 72 may calculate feedback torque by a feedback control. As described below, the feedforward torque and the feedback torque may be added together to obtain the target steering torque.

The feedforward torque calculating unit 71 may calculate feedforward torque Tp_ff_lane that generates the lane curvature turn target yaw rate γtgt_lane. The feedforward torque calculating unit 71 may also calculate feedforward torque Tp_ff_turn that generates the deviation prevention behavior generation target yaw rate γtgt_turn.

The feedforward torque Tp_ff_lane and Tp_ff_turn may be calculated with the use of a torque conversion gain Kyawr_to_trq. The torque conversion gain Kyawr_to_trq may be obtained by referring to a map of the yaw rate and the torque conversion gain. The map may be created in advance.

In other words, as represented by the following expression (10), the feedforward torque Tp_ff_lane may be calculated by multiplying the lane curvature turn target yaw rate γtgt_lane by the torque conversion gain Kyawr_to_trq. As represented by the following expression (11), the feedforward torque Tp_ff_turn may be calculated by multiplying the deviation prevention behavior generation target yaw rate γtgt_turn by the torque conversion gain Kyawr_to_trq.

$$Tp\_ff\_lane = Kyawr\_to\_trq \cdot \gamma tgt\_lane \quad (10)$$

$$Tp\_ff\_turn = Kyawr\_to\_trq \cdot \gamma tgt\_turn \quad (11)$$

The feedback torque calculating unit 72 may calculate feedback torque Tp_fb based on a deviation between the target yaw rate γtgt and an actual yaw rate γ of the own vehicle detected by the yaw rate sensor 25. In one specific but non-limiting example, the feedback torque Tp_fb may be calculated by a proportional integral differential (PID) control on the deviation (γtgt−γ) between the target yaw rate γtgt and the actual yaw rate γ, as represented by the following expression (12).

$$Tp\_fb = Kp \cdot (\gamma tgt - \gamma) + Ki \cdot \int (\gamma tgt - \gamma) dt + Kd \cdot d(\gamma tgt - \gamma)/dt \quad (12)$$

A proportional gain Kp, an integral gain Ki, and a differential gain Kd of the PID control in the expression (12) may be set in accordance with presence or absence of the driver's steering operation. In a case with the absence of the driver's steering operation, i.e., in a case where the torque sensor 22 does not detect the steering torque, the proportional gain Kp, the integral gain Ki, and the differential gain Kd may be set in accordance with characteristics optimally set in advance.

Meanwhile, in a case where the torque sensor 22 detects the driver's steering operation in a direction in which deviation is prevented, with the actual yaw rate overshooting the target yaw rate, the proportional gain Kp, the integral gain Ki, and the differential gain Kd may be brought to zero (0). For example, in a case of prevention of deviation from the lane line on the right side, with a value of the actual yaw rate being larger than a value of the target yaw rate, the proportional gain Kp, the integral gain Ki, and the differential gain Kd may be brought to zero (0). Thus, the feedback torque Tp_fb may be brought to zero (0), as represented by the following expression (13).

$$Tp\_fb = 0 \quad (13)$$

The feedforward torque Tp_ff_lane and Tp_ff_turn from the feedforward torque calculating unit 71, and the feedback torque Tp_fb from the feedback torque calculating unit 72 may be added together, as represented by the following expression (14), to calculate the target steering torque Tp.

$$Tp = Tp\_ff\_lane + Tp\_ff\_turn + Tp\_fb \quad (14)$$

The target steering torque Tp calculated in the target steering torque calculating unit 70 may be subjected to the rate limit processing in the rate limiter 75. By the rate limit processing, the speed of change in the target steering torque is reduced, in order to suppress the target steering torque from changing abruptly and from giving the sense of incongruity to the driver. To the steering torque Tp_lim subjected to the rate limit processing, added may be the friction compensation torque Tp_fric that compensates the friction in the steering system, as represented by the following expression (15). The resultant torque may be outputted as deviation prevention control torque Tp_cmd that serves as the instruction torque for the EPS motor 12.

$$Tp\_cmd = Tp\_lim + Tp\_fric \quad (15)$$

It is to be noted that the friction compensation torque Tp_fric may be calculated by multiplying the friction torque T_fric by a friction compensation rate Fr, as described below. The friction torque T_fric is estimated in the friction torque estimating unit 80. The friction compensation rate Fr is calculated in the friction compensation rate variable controlling unit 85.

The friction torque estimating unit 80 estimates the friction torque T_fric of the steering system. The steering system refers to an arrangement from the steering wheel 4 to the steering wheels through the steering mechanism. Estimating friction torque by, for example, experiments and simulation, and learning and updating vehicle by vehicle the estimated friction torque in accordance with characteristics of the steering system make it possible to reduce variations in the friction torque T_fric because of individual differences and secular changes.

Figure 4A:
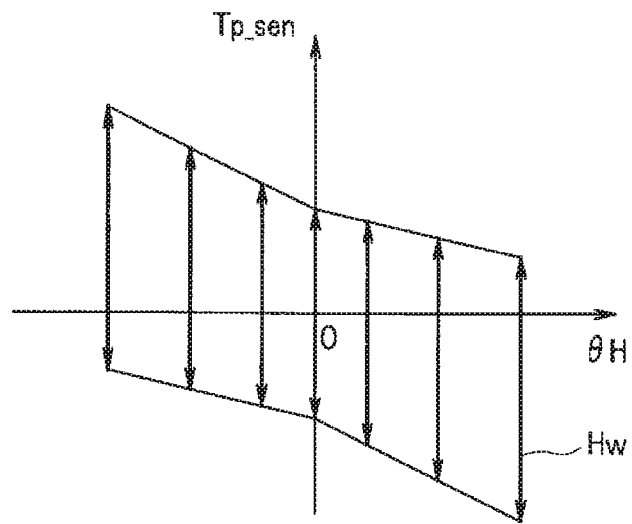
FIGS. 4A and 4B are diagrams illustrating estimation of friction torque.
Figure 4B:
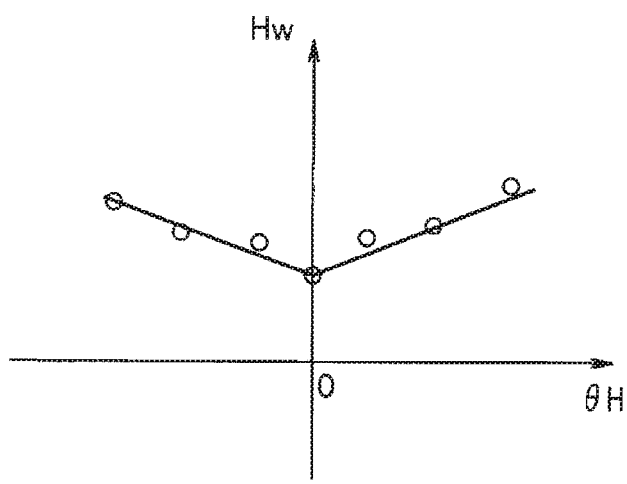

In one specific but non-limiting example, as illustrated in FIG. 4A, a measurement of a hysteresis width Hw may be made, in a coordinate system having the steering wheel angle θH and pinion axis torque Tp_sen as axes. The steering wheel angle θH is detected by the steering angle sensor 21. The pinion axis torque Tp_sen is detected by the torque sensor 22. As illustrated in FIG. 4B, the hysteresis width Hw may be projected on a coordinate system of the steering wheel angle θH and the hysteresis width Hw. The friction torque T_fric of the steering system may be estimated on the basis of a regression coefficient, i.e., an intercept, of a characteristic line. The characteristic line may be obtained by linear regression of a characteristic of the hysteresis width Hw versus the steering wheel angle θH. The friction torque T_fric thus estimated may be stored in a map.

As described later, the friction torque T_fric may be calculated separately as friction torque T_fric_fw during the deviation suppression control and friction torque T_fric_rv during the posture decision control. The friction torque T_fric_fw during the deviation suppression control and the friction torque T_fric_rv during the posture decision control may be calculated, on the basis of the friction torque T_fric obtained from the map, by, for example, multiplying the friction torque T_fric by respective predetermined gains.

It is to be noted that in one alternative, the friction torque T_fric may be estimated on the basis of a hysteresis width in a coordinate system having a current value of the EPS motor 12 and a motor rotation angle of the EPS motor 12 as axes. The current value of the EPS motor 12 may be detected by an undepicted current sensor. The motor rotation angle of the EPS motor 12 may be detected by the rotation angle sensor 23.

The friction compensation rate variable controlling unit 85 may perform the variable control of the friction compensation rate Fr at which the friction torque T_fric is added to the target steering torque Tp_lim after the rate limit processing. In this implementation, the friction torque T_fric may be obtained separately as the friction torque T_fric_fw during the deviation suppression control and the friction toque T_fric_rv during the posture decision control. The friction compensation rate may be able to vary solely for the friction torque T_fric_fw during the deviation suppression torque during which it is desirable to take the friction compensation torque into consideration in accordance with the driver's steering operation.

It is to be noted that the friction compensation rate Fr may be able to vary during the deviation suppression control after the start of the lane deviation prevention control. After a transition from the deviation suppression control to the posture decision control, the friction compensation rate Fr may be fixed to 100%.

The friction torque T_fric_fw during the deviation suppression control may be multiplied by the friction compensation rate Fr, as represented by the following expression (16), to calculate the friction compensation torque Tp_fric. The friction compensation rate Fr may be able to vary in a range from 0% to 100% both inclusive in accordance with the driver's steering torque Tdrv. The friction compensation torque Tp_fric that has been varied in accordance with the driver's steering torque may be added to the target steering torque Tp_lim after the rate limit processing.

$$Tp\_fric = T\_fric\_fw \times Fr \quad (16)$$

The friction compensation rate Fr is set on the basis of the driver's steering torque Tdrv and on the basis of a traveling state of the own vehicle. For example, the friction compensation rate Fr may be set on the basis of the driver's steering torque Tdrv, the vehicle speed V of the own vehicle, and the lane curvature κ. The setting of the friction compensation rate Fr may be so provided that the friction compensation rate Fr becomes larger as the driver's steering torque Tdrv becomes smaller, assuming that the vehicle speed V and the lane curvature κ are constant. Specifically, a map of the friction compensation rate may be created in advance, by obtaining, by, for example, running tests and simulation, the addition rate of the friction torque that is able to provide compatibility of lane deviation prevention performance with smooth torque variations and/or smooth changes in the steering angle.

In this implementation, as the map of the friction compensation rate, created may be two maps, i.e., a map for an inner curve and a map for an outer curve, in consideration of a case of prevention of deviation from a lane line on inner side of a curve and a case of prevention of deviation from a lane line on outer side of the curve. Either one of the two maps may be selected, to calculate the friction compensation rate Fr.

Figure 5:
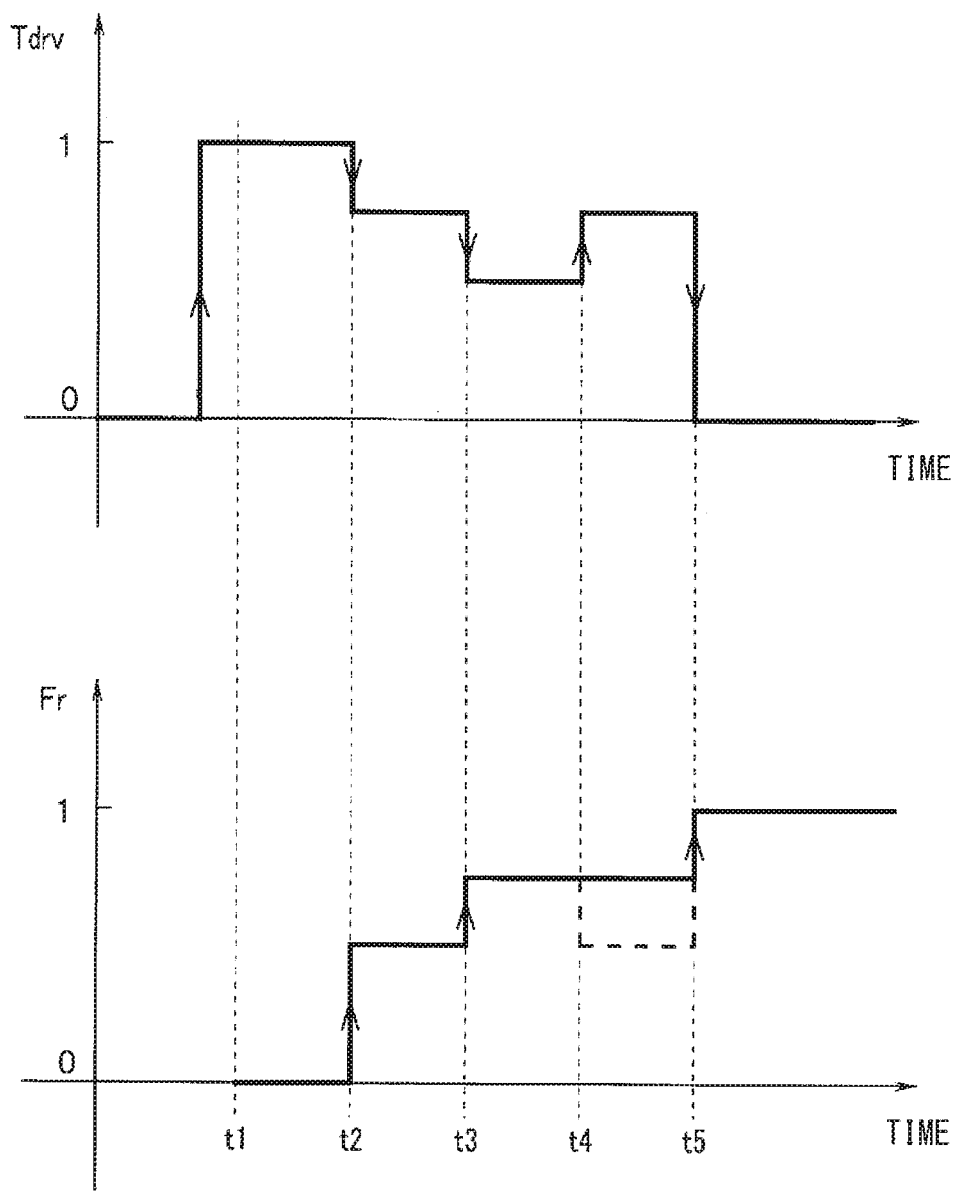
FIG. 5 is a diagram illustrating how a friction compensation rate varies.

In this case, the friction compensation rate Fr may be able to vary solely toward an increase from a value at the start of the lane deviation prevention control. Even if the driver's steering torque increases afterwards, no change in the friction compensation rate Fr toward a decrease is permitted. For example, assume that the driver's steering torque Tdrv is represented in a torque range from 0 to 1 both inclusive. In a case without the driver's steering operation (Tdrv=0), the friction compensation rate Fr is assumed to be 100% (Fr=1). In a case where the driver's steering torque is at its maximum (Tdrv=1), the friction compensation rate Fr is assumed to be 0% (Fr=0). On these assumptions, as illustrated in FIG. 5, the friction compensation rate Fr may be able to vary solely toward the increase, during the deviation suppression control after the start of the lane deviation prevention control, regardless of increases and decreases in the driver's steering torque Tdrv.

For example, assume that the lane deviation prevention control starts up at time t1, and that the own vehicle is under the deviation suppression control after time t1. At time t2, the driver's steering torque Tdrv decreases from 1 to 0.75. Upon the decrease, the friction compensation rate Fr may be increased from 0 to 0.5. Furthermore, at time t3, the driver's steering torque Tdrv decreases from 0.75 to 0.5. Upon the decrease, the friction compensation rate Fr may be increased from 0.5 to 0.75. Thereafter, at time t4, the driver's steering torque Tdrv increases from 0.5 to 0.75. Upon the increase, however, the friction compensation rate Fr may be maintained at 0.75, without being permitted to decrease as denoted by a broken line in FIG. 5. At time t5, the driver's steering torque Tdrv decreases from 0.75 to 0. Upon the decrease, the friction compensation rate Fr may be increased from 0.75 to 1.

In other words, in a case where the driver's steering operation causes a decrease in the friction compensation torque at the start of the lane deviation prevention control, and thereafter, the driver reduces the driver's steering torque during the deviation suppression control, to substantially eliminate the driver's steering operation, there occurs a deviation between the target yaw rate and the actual yaw rate. At this occasion, a feedback control is brought into operation to attain the target yaw rate, but the feedback control is not able to immediately compensate the deviation between the target yaw rate and the actual yaw rate. This may cause possibility of lowered lane deviation prevention performance. In this implementation, therefore, no change in the friction compensation rate toward the decrease is permitted, regardless of variations in the driver's steering torque after the start of the lane deviation prevention control. Hence, it is possible to prevent shortage of the deviation prevention control torque because of the decrease in the friction compensation torque.

Meanwhile, the friction torque T_fric_rv during the posture decision control may be calculated as the friction compensation torque Tp_fric having the friction compensation rate Fr fixed to a constant value. In this implementation, as represented by the following expression (17), the friction compensation torque T_fric may be calculated, with the friction compensation rate Fr being 1 (Fr=1). That is, the friction torque T_fric_rv during the posture decision control may serve, as it is, as the friction compensation torque Tp_fric. Thus, the friction torque T_fric_rv during the posture decision control may be added to the target steering torque Tp_lim after the rate limit processing.

$$Tp\_fric = T\_fric\_rv \quad (17)$$

Description now moves on to program processing related to the lane deviation prevention control as described above, with reference to flowcharts of FIGS. 6 to 9. The lane deviation prevention control is to be executed by the steering controller 50.

Figure 6:
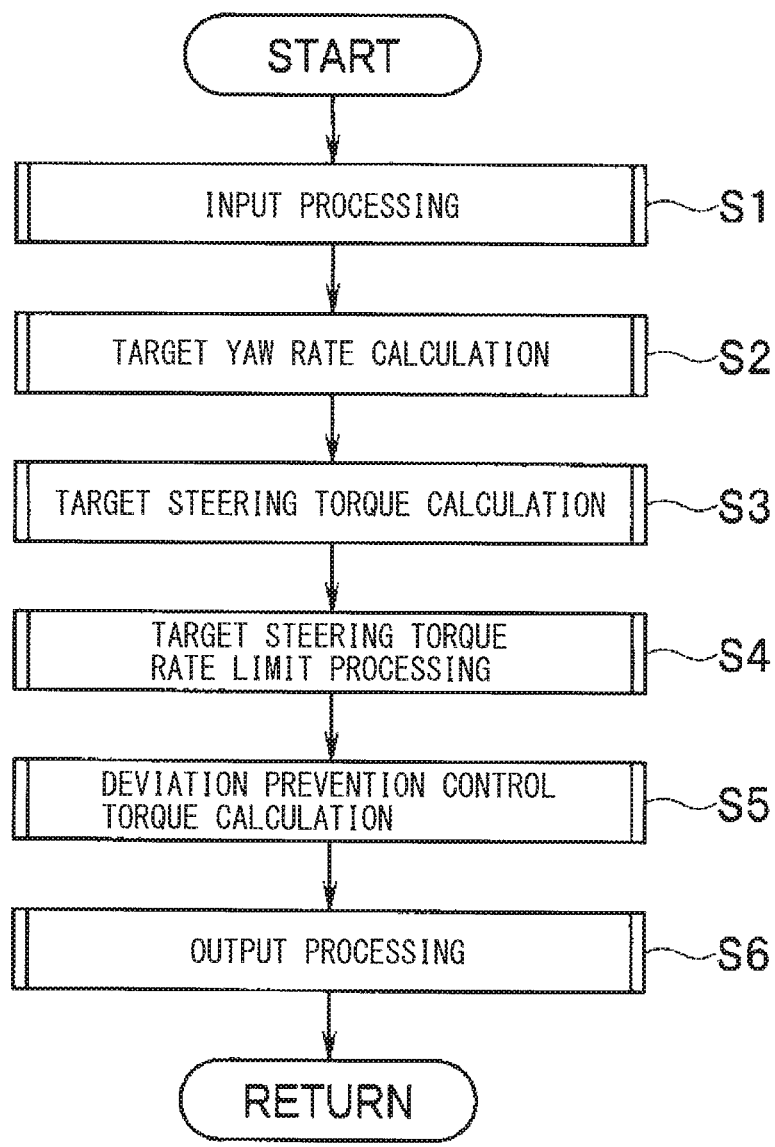
FIG. 6 is a flowchart illustrating an example of a routine of a lane deviation prevention control.

First, referring to the flowchart of FIG. 6, described is a routine of the lane deviation prevention control. The routine of the lane deviation prevention control may be started in a case where a start condition of the lane deviation prevention control is satisfied. For example, assuming that the lane line on the left side in the traveling direction is a lane line as a target of deviation prevention, the start condition may include that the current relative-to-lane yaw angle θyaw of the own vehicle satisfies θyaw≥0, i.e., that the current relative-to-lane yaw angle θyaw is directed to the direction of deviation, and that the lane deviation estimated time Ttlc is equal to or smaller than the threshold Tth. The lane deviation estimated time Ttlc means the time it takes for the own vehicle to deviate from the lane. The threshold Tth may be decided by the vehicle speed V and the lane curvature κ.

In the routine of the lane deviation prevention control, first, in step S1, the steering controller 50 may perform input processing. The input processing includes inputting, for example, sensor signals, recognition information, and control information. For example, the steering controller 50 may input signals from the sensors and undepicted switches, the recognition information by the camera from the exterior environment recognition device 150, and the control information from other controllers through the communication bus 200. Non-limiting examples of the sensors may include the steering angle sensor 21, the torque sensor 22, the rotation angle sensor 23, the vehicle speed sensor 24, and the yaw rate sensor 25.

Thereafter, the routine may proceed to step S2. In step S2, the lane curvature turn target yaw rate γtgt_lane and the deviation prevention behavior generation target yaw rate γtgt_turn may be calculated as the target yaw rate. In step S3, the target steering torque Tp may be calculated. The target steering torque Tp is provided for achievement of the target yaw rate γtgt. The target steering torque Tp may be the addition of the feedforward torque Tp_ff_lane and Tp_ff_turn, and the feedback torque Tp_fb. The feedforward torque Tp_ff_lane and Tp_ff_turn may be obtained by torque conversion of the lane curvature turn target yaw rate γtgt_lane and the deviation prevention behavior generation target yaw rate γtgt_turn. The feedback torque Tp_fb may be based on the deviation between the target yaw rate γtgt and the actual yaw rate γ. However, in a case with detection of the driver's steering operation in the direction in which the deviation is prevented, with the actual yaw rate overshooting the target yaw rate, the feedback torque Tp_fb may be brought to zero (0).

Figure 7:
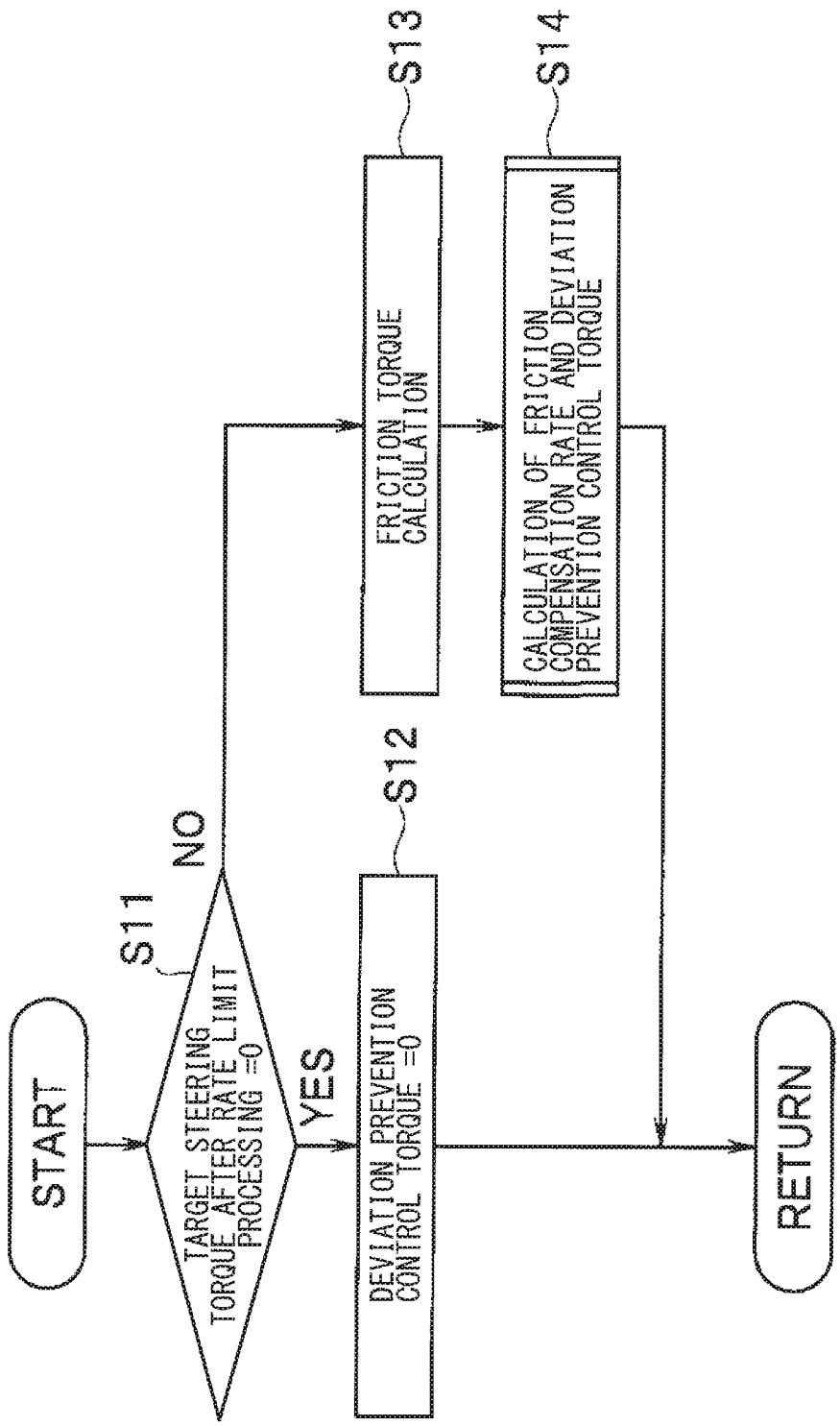
FIG. 7 is a flowchart illustrating an example of a routine of calculation of deviation prevention control torque.

Thereafter, the routine may proceed to step S4. In step S4, the target steering torque Tp may be inputted to the rate limiter 75, to be subjected to the rate limit processing. The rate limit processing may include reducing the speed of change in the torque. In step S5, executed may be a routine of calculation of the deviation prevention control torque, as illustrated in FIG. 7. The routine of the calculation of the deviation prevention control torque may include adding the friction compensation torque Tp_fric to the target steering torque Tp_lim after the rate limit processing, to calculate the deviation prevention control torque Tp_cmd. Thereafter, in step S6, output processing may be performed. The output processing may include outputting the deviation prevention control torque Tp_cmd, to the motor driver 20 that drives the EPS motor 12.

Description is given of the routine of the calculation of the deviation prevention control torque to be executed in step S5 of the forgoing routine of the lane deviation prevention control, with reference to FIG. 7. In the routine of the calculation of the deviation prevention control torque, first, in step S11, a check may be made as to whether or not the target steering torque Tp_lim after the rate limit processing is zero (0). In a case where the target steering torque Tp_lim after the rate limit processing is zero (Tp_lim=0), the routine may proceed from step S11 to step S12. In step S12, the deviation prevention control torque Tp_cmd may be brought to zero (0).

Figure 8:
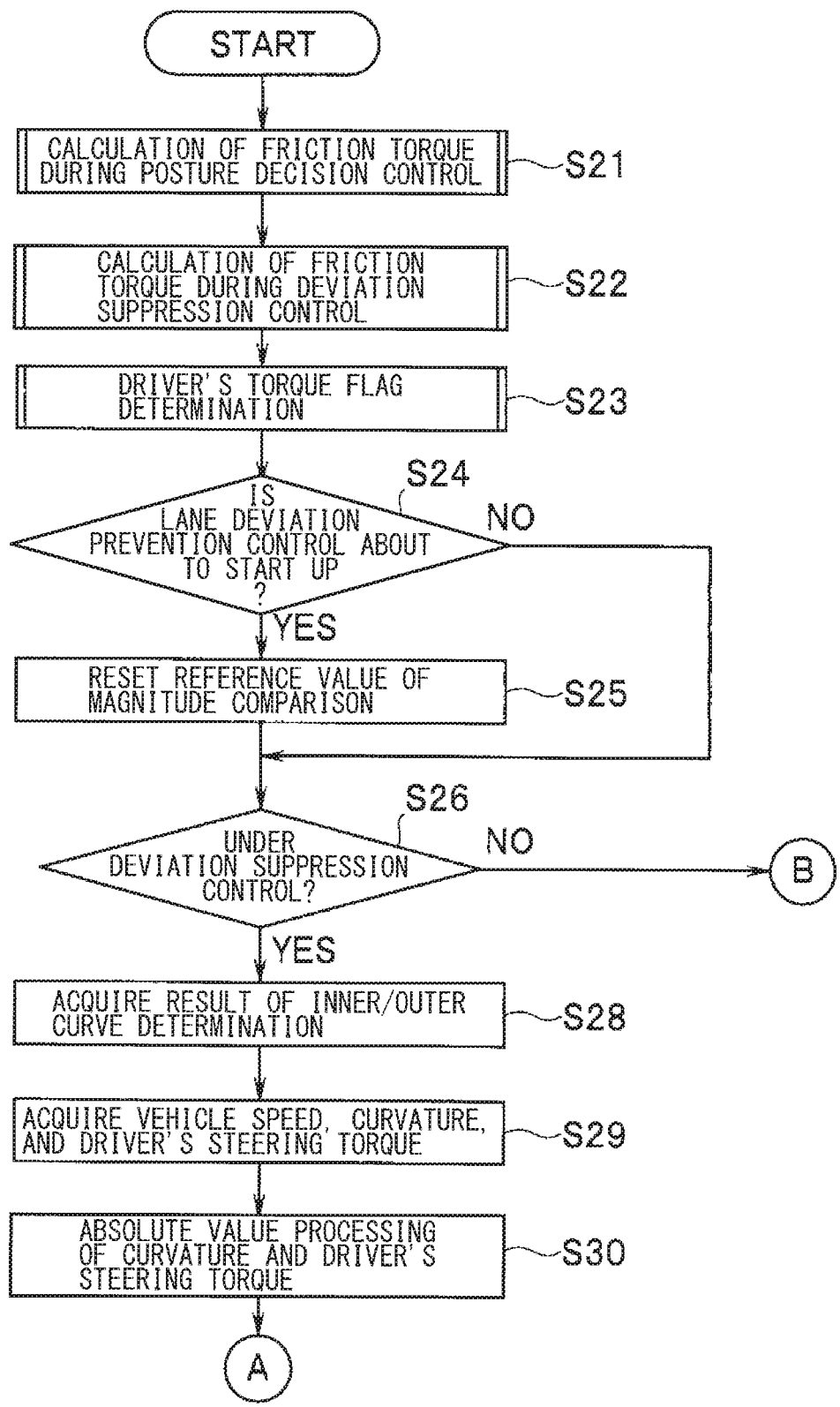
FIG. 8 is a flowchart illustrating an example of a first part of a routine of calculation of the friction compensation rate and the deviation prevention control torque.
Figure 9:
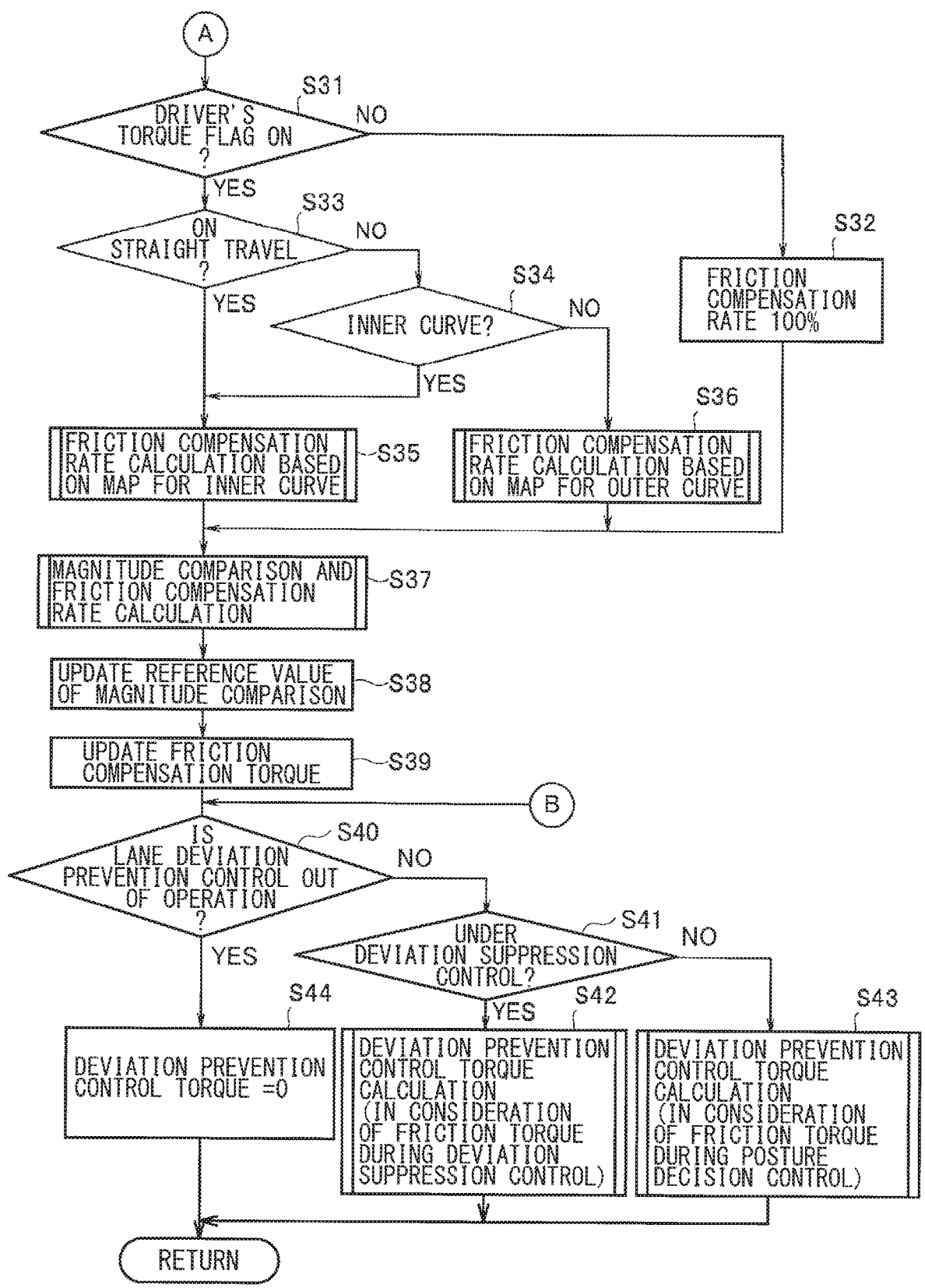
FIG. 9 is a flowchart illustrating an example of a second part of the routine of the calculation of the friction compensation rate and the deviation prevention control torque.

In step S11, in a case where the target steering torque Tp_lim after the rate limit processing is not zero (Tp_lim≠0), the routine may proceed from step S11 to step S13. In step S13, the friction torque T_fric of the steering system may be calculated. In step S14, executed may be a routine of calculation of the friction compensation rate and the deviation prevention control torque, as illustrated in FIGS. 8 and 9. In the routine of the calculation of the friction compensation rate and the deviation prevention control torque, the friction compensation torque Tp_fric may be set from the friction torque T_fric, to calculate the deviation prevention control torque Tp_cmd.

Description is given next of the routine of the calculation of the friction compensation rate and the deviation prevention control torque to be executed in step S14, with reference to flowcharts of FIGS. 8 and 9.

In the routine of the calculation of the friction compensation rate and the deviation prevention control torque, first, in steps S21 and S22, the friction torque T_fric_rv during the posture decision control and the friction torque T_fric_fw during the deviation suppression control may be calculated. In this implementation, the friction torque T_fric_rv during the posture decision control and the friction torque T_fric_fw during the deviation suppression control may be calculated by, for example, multiplying the friction torque T_fric by the respective predetermined gains. The friction torque T_fric may be obtained by referring to the map.

Thereafter, in step S23, a determination may be made as to a driver's torque flag that indicates presence or absence of an input of the driver's steering torque produced by the driver's steering operation during the deviation suppression control. As to the driver's torque flag, "ON" indicates the presence of the driver's steering torque during the deviation suppression control, while "OFF" indicates the absence of the driver's steering torque, or alternatively, the "OFF" indicates that the deviation suppression control has been ended and that a transition has been made to the posture decision control. After the determination as to whether the driver's torque flag is turned "ON" or whether the driver's torque flag is turned "OFF" in step S23, the routine may proceed to step S24. In step S24, a check may be made as to whether or not the lane deviation prevention control is about to start up.

In step S24, in a case where the lane deviation prevention control is not about to start up, the routine may jump to step S26. In step S24, in a case where the lane deviation prevention control is about to start up, the routine may proceed to step S25. In step S25, a reference value of magnitude comparison may be reset. The resetting of the reference value of the magnitude comparison may be provided for step S37 described later, in which the magnitude comparison is made between values of the friction compensation rate calculated on respective control cycles, allowing the friction compensation rate to be able to vary solely toward the increase. The reference value may be updated on each control cycle, and be reset at a predetermined value, e.g., zero (0) as a minimum value, at the start of the lane deviation prevention control.

Thereafter, the routine may proceed to step S26. In step S26, a determination may be made as to whether or not the own vehicle is currently under the deviation suppression control. The determination as to whether or not the own vehicle is under the deviation suppression control may be made on the basis of, for example, an amount of change in the yaw angle and a direction of the yaw angle.

In step S26, in a case where the own vehicle is not under the deviation suppression control, the routine may jump to step S40 described later. In step S26, in a case where the own vehicle is under the deviation suppression control, the routine may proceed to step S28. In step S28, acquired may be a determination result as to whether the direction of deviation is on the inner side of the curve of a traveled road or whether the direction of deviation is on the outer side of the curve of the traveled road. In step S29, acquired may be the vehicle speed V, the curvature κ of the curve, and the driver's steering torque Tdrv.

Thereafter, in step S30, absolute value processing may be performed. The absolute value processing includes acquiring absolute values of the curvature κ and the driver's steering torque Tdrv. The routine may proceed to step S31. In step S31, a check may be made as to whether the driver's torque flag is turned "ON" or whether the driver's torque flag is turned "OFF". In a case where the driver's torque flag is turned "OFF", the routine may proceed to step S32. In step S32, the friction compensation rate Fr may be set at 100% (Fr=1). Thereafter, the routine may proceed to step S37.

In step S31, in a case where the driver's torque flag is turned "ON", the routine may proceed to step S33. In step S33, a determination may be made as to whether or not the own vehicle is on straight travel. The "straight travel" as used here means a case where the curvature κ is zero (κ=0(1/m)) in which no determination can be made as to whether the own vehicle is traveling on the inner side of the curve or whether the own vehicle is traveling on the outer side of the curve. In step S33, in a case where the own vehicle is not on the straight travel, the routine may proceed to step S34. In step S34, a check may be made as to whether or not the own vehicle is traveling on the inner side of the curve, with reference to the determination result as to whether the own vehicle is traveling on the inner side of the curve or whether the own vehicle is traveling on the outer side of the curve.

In a case where the own vehicle is traveling on the inner side of the curve, the routine may proceed from step S34 to step S35. In step S35, the friction compensation rate Fr may be calculated from the map for the inner curve, on the basis of the vehicle speed V, the absolute value of the curvature κ, and the absolute value of the driver's steering torque Tdrv. The map for the inner curve may be also used in the case of the straight travel. In step S33, in the case where the determination has been made that the own vehicle is on the straight travel, the friction compensation rate Fr may be also calculated from the map for the inner curve. Meanwhile, in step S34, in a case where the own vehicle is not traveling on the inner side of the curve, the routine may proceed from step S34 to step S36. In step S36, the friction compensation rate Fr may be calculated from the map for the outer curve, on the basis of the vehicle speed V, the absolute value of the curvature κ, and the absolute value of the driver's steering torque Tdrv.

After the calculation of the friction compensation rate Fr, the routine may proceed to step S37. In step S37, the magnitude comparison may be made between a latest value and a previous value of the friction compensation rate Fr, to check their relation in magnitude, to permit the friction compensation rate Fr to vary solely toward the increase. In other words, in a case where the latest value of the friction compensation rate Fr is larger than the previous value, the latest value may be calculated and maintained as the friction compensation rate Fr. In a case where the latest value of the friction compensation rate Fr is equal to or smaller than the previous value, the previous value may be maintained as the friction compensation rate Fr.

Thereafter, in step S38, the friction compensation rate Fr maintained this time may be stored as the friction compensation rate Fr at previous time, to update the reference value of the magnitude comparison. Thus, the routine may proceed to step S39. In step S39, as described in relation to the expression (16), the friction torque T_fric_fw during the deviation suppression control may be multiplied by the friction compensation rate Fr, to update the friction compensation torque Tp_fric.

Thereafter, the routine may proceed to step S40. In step S40, a check may be made as to whether or not the lane deviation prevention control is out of operation. In a case where the lane deviation prevention control is on operation, the routine may proceed to step S41. In step S41, a check may be made as to whether or not the own vehicle is under the deviation suppression control, to calculate the deviation prevention control torque Tp_cmd in accordance with whether or not the own vehicle is under the deviation suppression control. In step S40, in a case where the lane deviation prevention control is out of operation, the routine may proceed from step S40 to step S44.

In other words, in step S41, in a case where the own vehicle is under the deviation suppression control, the routine may proceed from step S41 to step S42. In step S42, the friction torque T_fric_fw during the deviation suppression control may be multiplied by the friction compensation rate Fr, to obtain the friction compensation torque Tp_fric in consideration of the friction torque T_fric_fw during the deviation suppression torque. The resultant value of the multiplication may be added to the target steering torque Tp_lim after the rate limit processing, to calculate the deviation prevention control torque Tp_cmd.

In step S41, in a case where the own vehicle is not under the deviation suppression control, the routine may proceed from step S41 to step S43. In step S43, the friction torque T_fric_rv during the posture decision control may serve as the friction compensation torque Tp_fric in consideration of the friction torque T_fric_rv during the posture decision control. The friction torque T_fric_rv during the posture decision control may be added to the target steering torque Tp_lim after the rate limit processing, to calculate the deviation prevention control torque Tp_cmd.

In step S40, in a case where the lane deviation prevention control is out of operation, the routine may proceed from step S40 to step S44. In step S44, the deviation prevention control torque Tp_cmd may be brought to zero (0).

As described, in this implementation, in the case with the presence of the driver's steering operation at the start of the lane deviation prevention control, the variable control of the addition rate at which the friction torque is added to the target steering torque is made, on the basis of the driver's steering torque and on the basis of the traveling state of the own vehicle. This makes it possible to prevent the driver's steering operation from causing the excess or the deficiency in the instruction torque for the EPS motor 12. Hence, it is possible to appropriately compensate the friction in the steering system in accordance with the driver's steering operation, leading to the prevention of the lane deviation without giving the sense of incongruity to the driver.

The steering controller 50 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the steering controller 50 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the steering controller 50 illustrated in FIG. 1.

Although the technology has been described in terms of exemplary implementations, it is not limited thereto. It should be appreciated that variations may be made in the described implementations by persons skilled in the art without departing from the scope of the invention as defined by the following claims. The limitations in the claims are to be interpreted broadly based on the language employed in the claims and not limited to examples described in this specification or during the prosecution of the application, and the examples are to be construed as non-exclusive. For example, in this disclosure, the term "preferably", "preferred" or the like is non-exclusive and means "preferably", but not limited to. The use of the terms first, second, etc. do not denote any order or importance, but rather the terms first, second, etc. are used to distinguish one element from another. The term "substantially" and its variations are defined as being largely but not necessarily wholly what is specified as understood by one of ordinary skill in the art. The term "about" or "approximately" as used herein can allow for a degree of variability in a value or range. Moreover, no element or component in this disclosure is intended to be dedicated to the public regardless of whether the element or component is explicitly recited in the following claims.

Although some implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A lane deviation prevention control device for vehicle, the lane deviation prevention control device comprising:
a target steering torque calculator configured to calculate target steering torque to be applied to a steering system of an own vehicle in a lane deviation prevention control, the lane deviation prevention control including preventing the own vehicle from deviating from a lane on which the own vehicle is traveling;
a friction torque estimator configured to estimate friction torque of the steering system;
a friction compensation rate variable controller configured to perform, on a basis of steering torque produced by a driver's steering operation and on a basis of a traveling state of the own vehicle, a variable control of an addition rate at which the friction torque is added to the target steering torque to compensate friction in the steering system; and
a limit processor configured to perform rate limit processing, the rate limit processing including reducing a speed of change in the target steering torque,
wherein the friction compensation rate variable controller performs the variable control of the addition rate at which the friction torque is added to the target steering torque subjected to the rate limit processing in the limit processor.

2. The lane deviation prevention control device for vehicle according to claim 1, wherein the friction compensation rate variable controller allows the addition rate to be able to vary solely toward an increase, and refrains from permitting the addition rate to vary toward a decrease.

3. The lane deviation prevention control device for vehicle according to claim 1, wherein the friction compensation rate variable controller performs the variable control of the addition rate of the friction torque, on the basis of the steering torque produced by the driver's steering operation, on a basis of a vehicle speed of the own vehicle, and on a basis of a curvature of the lane.

4. The lane deviation prevention control device for vehicle according to claim 2, wherein the friction compensation rate variable controller performs the variable control of the addition rate of the friction torque, on the basis of the steering torque produced by the driver's steering operation, on a basis of a vehicle speed of the own vehicle, and on a basis of a curvature of the lane.

5. The lane deviation prevention control device for vehicle according to claim 1, wherein
the lane deviation prevention control includes making a switchover between a deviation suppression control and a posture decision control, the deviation suppression control including suppressing lane deviation, and the posture decision control including controlling a posture of the own vehicle after the deviation suppression control until an arrival at a location of an end of the lane deviation prevention control,
the friction compensation rate variable controller calculates, on a basis of the friction torque estimated in the friction torque estimator, friction torque during the deviation suppression control and friction torque during the posture decision control, and
the friction compensation rate variable controller further performs a variable control of an addition rate at which the friction torque during the deviation suppression control is added to the target steering torque, and makes constant an addition rate at which the friction torque during the posture decision control is added to the target steering torque.

6. The lane deviation prevention control device for vehicle according to claim 2, wherein
the lane deviation prevention control includes making a switchover between a deviation suppression control and a posture decision control, the deviation suppression control including suppressing lane deviation, and the posture decision control including controlling a posture of the own vehicle after the deviation suppression control until an arrival at a location of an end of the lane deviation prevention control,
the friction compensation rate variable controller calculates, on a basis of the friction torque estimated in the friction torque estimator, friction torque during the deviation suppression control and friction torque during the posture decision control, and the friction compensation rate variable controller further performs a variable control of an addition rate at which the friction torque during the deviation suppression control is added to the target steering torque, and makes constant an addition rate at which the friction torque during the posture decision control is added to the target steering torque.

7. The lane deviation prevention control device for vehicle according to claim 3, wherein
the lane deviation prevention control includes making a switchover between a deviation suppression control and a posture decision control, the deviation suppression control including suppressing lane deviation, and the posture decision control including controlling a posture of the own vehicle after the deviation suppression control until an arrival at a location of an end of the lane deviation prevention control,
the friction compensation rate variable controller calculates, on a basis of the friction torque estimated in the friction torque estimator, friction torque during the deviation suppression control and friction torque during the posture decision control, and
the friction compensation rate variable controller further performs a variable control of an addition rate at which the friction torque during the deviation suppression control is added to the target steering torque, and makes constant an addition rate at which the friction torque during the posture decision control is added to the target steering torque.

8. The lane deviation prevention control device for vehicle according to claim 4, wherein
the lane deviation prevention control includes making a switchover between a deviation suppression control and a posture decision control, the deviation suppression control including suppressing lane deviation, and the posture decision control including controlling a posture of the own vehicle after the deviation suppression control until an arrival at a location of an end of the lane deviation prevention control,
the friction compensation rate variable controller calculates, on a basis of the friction torque estimated in the friction torque estimator, friction torque during the deviation suppression control and friction torque during the posture decision control, and
the friction compensation rate variable controller further performs a variable control of an addition rate at which the friction torque during the deviation suppression control is added to the target steering torque, and makes constant an addition rate at which the friction torque during the posture decision control is added to the target steering torque.

9. A lane deviation prevention control device for vehicle, the lane deviation prevention control device comprising circuitry configured to
calculate target steering torque to be applied to a steering system of an own vehicle in a lane deviation prevention control, the lane deviation prevention control including preventing the own vehicle from deviating from a lane on which the own vehicle is traveling,
estimate friction torque of the steering system,
performs, on a basis of steering torque produced by a driver's steering operation and on a basis of a traveling state of the own vehicle, a variable control of an addition rate at which the friction torque is added to the target steering torque to compensate friction in the steering system, and
performs rate limit processing, the rate limit processing including reducing a speed of change in the target steering torque,
wherein the variable control of the addition rate at which the friction torque is added to the target steering torque subjected to the rate limit processing in the limit processor is performed.

* * * * *